(12) United States Patent
Agnew

(10) Patent No.: US 9,020,730 B2
(45) Date of Patent: Apr. 28, 2015

(54) SAFETY INTERLOCK SYSTEM WITH SIDE AREA DETECTION

(71) Applicant: Continental Automotive Systems, Inc., Auburn Hills, MI (US)

(72) Inventor: David Agnew, Clarkston, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/101,838

(22) Filed: Dec. 10, 2013

(65) Prior Publication Data

US 2014/0172263 A1 Jun. 19, 2014

Related U.S. Application Data

(60) Provisional application No. 61/736,785, filed on Dec. 13, 2012.

(51) Int. Cl.
*B60T 7/12* (2006.01)
*B60Q 1/26* (2006.01)
*B60T 17/18* (2006.01)
*B60T 7/22* (2006.01)

(52) U.S. Cl.
CPC .. *B60T 17/18* (2013.01); *B60T 7/22* (2013.01)

(58) Field of Classification Search
USPC ............................................ 701/78; 340/433
See application file for complete search history.

(56) References Cited

U.S. PATENT DOCUMENTS

| 5,493,269 | A  | * | 2/1996  | Durley et al.   | 340/433 |
| 5,812,052 | A  | * | 9/1998  | Swanger et al.  | 340/433 |
| 6,601,669 | B1 | * | 8/2003  | Agnew           | 180/275 |
| 7,559,575 | B1 | * | 7/2009  | Cook et al.     | 280/756 |
| 8,473,173 | B1 | * | 6/2013  | Robles          | 701/70  |
| 2010/0312446 | A1 | * | 12/2010 | Schofield et al. | 701/70  |
| 2012/0307064 | A1 | * | 12/2012 | Schenken et al. | 348/149 |
| 2014/0172263 | A1 | * | 6/2014  | Agnew           | 701/78  |

* cited by examiner

*Primary Examiner* — Thomas G Black
*Assistant Examiner* — Tyler Paige

(57) ABSTRACT

A safety interlock system for a motor vehicle has a plurality of object sensors capable of detecting the presence of an object such as a pedestrian in the danger zone at the front of the vehicle, rear the vehicle or proximate to the wheels. A door sensor is capable of detecting the open or closed state of the vehicle doors. An interlock override switch and a control circuit are also connected to the safety interlock system. The control circuit is capable of activating the safety interlock system when a door open signal is received. When the safety interlock system is activated the control circuit may engage the brakes to prevent motion of the vehicle if an object signal is received from the object sensor.

17 Claims, 2 Drawing Sheets

SAFETY INTERLOCK SYSTEM WITH SIDE AREA DETECTION

CROSS REFERENCE TO RELATED APPLICATION

This application claims priority to U.S. Provisional Application No. 61/736,785 which was filed on Dec. 13, 2012 the entire contents of which is incorporated herein by reference.

TECHNICAL FIELD

This invention generally relates to a method and apparatus for increasing pedestrian safety near vehicles by connecting object detector sensors located at the front, rear, and sides of a vehicle to a vehicle antilock braking system, traction control system or engine controls with appropriate circuitry to prevent vehicle motion when a pedestrian is present.

BACKGROUND

An automotive vehicle may include sensor arrays and cameras mounted to the vehicle to detect objects in the area around the vehicle for various safety systems for the vehicle and the driver. The vehicle utilizes the sensors and cameras to detect objects in the vehicle path. The various safety systems utilize the date to provide warnings to the driver and to initiate safety vehicle responses to minimize and/or avoid collisions.

According to the National Highway Transportation Safety Administration, pedestrian fatalities while loading and unloading school buses account for approximately three times as many fatalities as when the passengers are on board the bus. Younger children are particularly vulnerable to fatal pedestrian school bus accidents according to the Transportation Research Board.

In response to this problem, various operational procedures, such as safety training of children and the addition of monitors to the bus crew have been implemented. While these precautions are partially effective, the restricted visibility at the immediate front and rear of buses which transport young children continues to expose errant children to a potential hazard when they walk into a position where the drivers vision is obscured. Despite these operational safeguards, there is still a yearly death toll because children alight from the bus and proceed into an obscured area, particularly in the "danger zones" directly in front of or to the rear of the bus.

Another response to school bus loading and unloading fatalities is the use of crossing control arms exemplified by U.S. Pat. No. 4,697,541. A crossing arm unit consists of a frame attached to the front bumper of a bus and an arm pivotally mounted to the frame which swings out from the bumper to provide a gate for the purpose of guiding children away from the front of the bus. Typically, a motor, slip clutch, switches and controls actuate such control arms.

There are a number of known disadvantages to these units. The foremost is that a child may simply walk around the arm, in which case the arm may even create a false sense of security in the driver. The arm is fundamentally a passive safety system which depends on the behavior of the children for effectiveness. To prevent evasion of the arm, U.S. Pat. Nos. 5,564, 359 and 5,620,219 describe complex safety systems with two arms connected by a cable or band which open into a rectangular cordon in front of the bus.

The arm itself is a vulnerable projection from the vehicle when deployed, subject to being struck and damaged by other vehicles. The actuation motor and controls are in an extreme environment on the lower front of the vehicle and corrosion of motors wiring connections and sensors is common. Furthermore the arm itself swings out and can strike a pedestrian, necessitating the slip clutch to prevent striking a substantial blow.

Crossing control arms are required in 18 states, representing 37% of the United States population. While the trend in loading zone fatalities over the last 10 years has generally been downward and there is some evidence that crossing arms have contributed to this decline, the latest data from the Kansas State Department of Education's nationwide School Bus Loading and Unloading Zone Survey calls the effectiveness of crossing arms into question and points to the need for additional effective safety measures. For the 1998-99 school year loading fatalities rose significantly and the 36% of states requiring crossing arms accounted for a disproportionate 66% of the fatalities. Furthermore, this same study points out that over the past ten years between ⅓ and ½ of the fatalities occur at the rear of the bus, an aspect of loading zone safety which crossing control arms do not address.

A different approach improving loading zone safety which is applicable to both the front and rear of a vehicle are electronic proximity sensors. Proximity sensors capable of detecting a human presence adjacent to a vehicle are well known in the art using methods such as radar, ultrasonics and electo-optics. Typical applications of such sensors for the detection of other vehicles while moving are found in U.S. Pat. Nos. 4,015,232, and 4,766,421. U.S. Pat. No. 5,160,927 describes an ultrasonic system apparently intended to provide a warning while the vehicle is either stationary or mobile. Sensors of these types have the inherent reliability and self-test advantages of a solid-state electronic device when compared to a mechanical crossing control arm. A combination of both a crossing control arm and a proximity sensor is described in U.S. Pat. No. 5,132,662 which coordinates the actions of both safety systems to detect a child that has evaded the arm.

What is notable about the prior sensor art is that each device provides only a warning, either audible or visual, upon which the driver must act. Thus, similar to a crossing control arm, sensor based detection of a pedestrian in the proximity of a vehicle is a passive system, dependent on further action from the driver to prevent injury to the child.

Modern automotive vehicles employ a number of electronic control systems, such as antilock braking systems, traction control systems or engine controls with appropriate circuitry to control vehicle motion. Upon receiving a signal, these electronic control systems can be used individually or in concert to prevent vehicle movement by creating brake fluid pressure for applying the vehicle service brakes. For example, a traction control system can apply the brakes or limit the throttle position or an engine control can limit the engine output or stop the engine altogether.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Accordingly, this invention provides for a vehicle safety interlock system which prevents vehicle motion when an object, such as a child, is in the danger zones at the front, rear, or sides of the vehicle, overcoming the problems and disadvantages of the conventional techniques in the art. The invention further provides an active safety system for vehicles which functions automatically without depending on the driver or passengers for effectiveness and which uses existing vehicle electronic control systems.

Briefly, the invention includes an object detection sensor located at the front, rear, or sides of the vehicle proximate to the wheels, which provides a signal upon the presence of a person when the vehicle is stopped. The signal is supplied to an existing electronic control module of the vehicle capable of preventing vehicle motion.

Further objects, features and advantages of the invention will become apparent from consideration of the following description and the appended claims when taken in connection with the accompanying drawings. Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
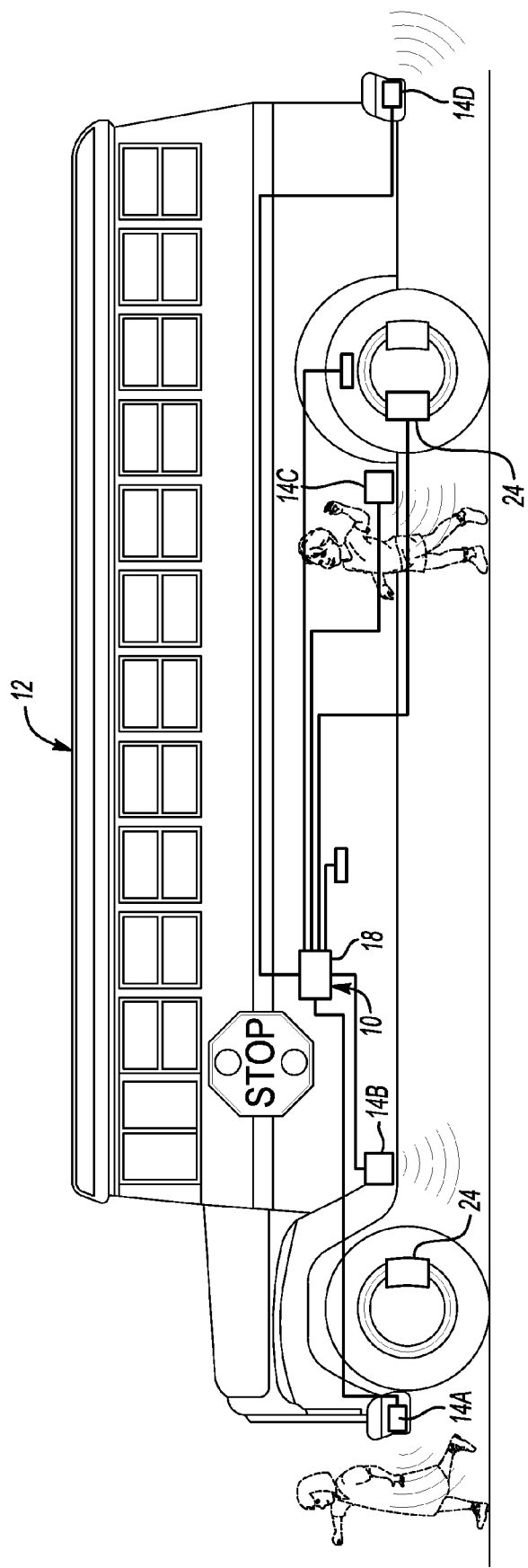
FIG. 1 is a side view of a school bus incorporating the present invention.

The following description is merely exemplary in nature and is in no way intended to limit the disclosure, its application, or uses. For purposes of clarity, the same reference numbers will be used in the drawings to identify similar elements. Throughout the applications the relative directions of forward and rear are in reference to the direction which an operator for the vehicle 10 would primarily be facing when operating the vehicle 10.

Shown in FIG. 1 is the child safety braking and motor interlock system 10 implemented on a school bus 12. A front object detection sensor 14A is located at the front of a his to allow detection of a child's presence in the danger zone immediately forward of the bus 12. If desired a rear object detector 14D is located at the rear of the bus 12 to provide rearward detection. Additional detection sensors 14B, C (14E and 14F are not shown in FIG. 1) are also located on the side of the bus 12. The sensors 14E, F are positioned on the side of the vehicle with the main entry door for loading and unloading passengers and sensors 14B, C may be located on the opposite side of the bus 12 as well. In particular, the detection sensors 14B, C, E, F are located proximate to the wheels 25 on either side of the bus.

Buses 12 frequently have children walking along the side of the bus 12 on sidewalk and/or the sides of a road. There is a large under body gap due to the height of the bus 12 and between the wheels 25 of the bus 12 due to the length. Children could therefore easily fall or move Binder the bus 12 in position that would cause contact if the bus were to move at the wrong time. In particular, on the sides of the bus 12 in the area immediately in front of and behind the wheels 25 is an area of concern. Therefore although the bus 12 does not travel in a side direction both sides of the bus are a danger zone for either forward or rearward travel. The detection sensors 14B, C, E, F located on the sides of the bus may detect an area immediately prior to and following the wheels 25, or the entire area between the wheels 25 and proximate to the side of the bus 12, to protect pedestrians whether the bus 12 is in forward or reverse motion. Greater or fewer detection sensors 14B, C, E, F may be used on the sides of the bus that what is shown. One skilled in the art would be able to determine the number of sensors 14B, C, E, F that is desirable for a particular bus 12 configuration.

When an object, is in the danger zones, a signal from the detector sensors 14A-F is fed to the antilock braking system (ABS) control module 18 which in turn activates the vehicle brakes 24 if other signals indicate the vehicle is stopped. In this manner movement of the bus 12 is automatically prevented whenever a child is within a danger zone, that is, in a position to be injured by movement of the bus 12. Interlock system 10 is of the type which can actively generate and apply braking pressure, without requiring the operator to depress the service brake pedal (not shown). This system is thus distinguishable from basic antilock braking systems used on many vehicles, which are capable of modulating existing brake pressure created by actuation of the brake pedal.

Figure 2:
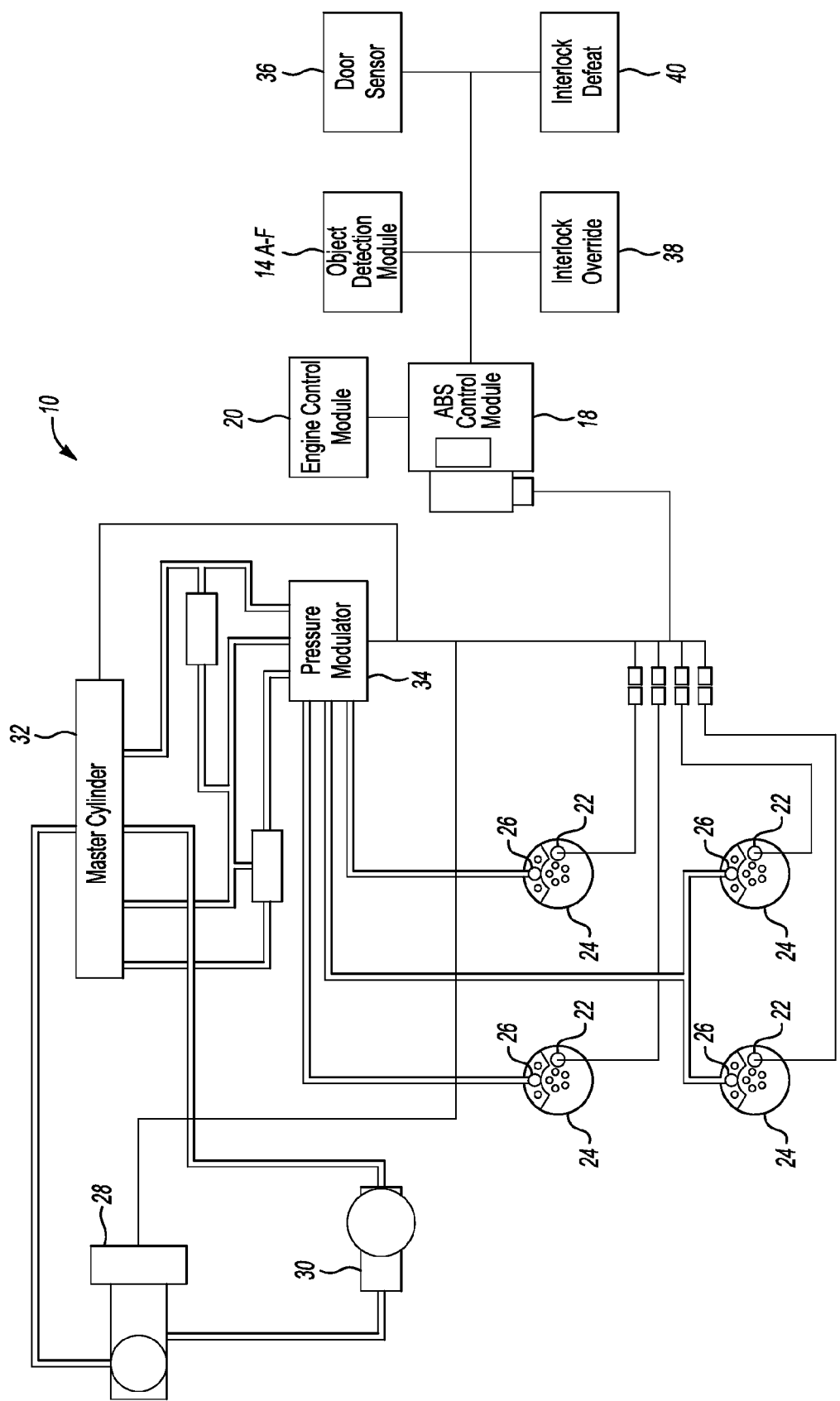
FIG. 2 is a schematic view of a vehicle braking system and the additional components of the present invention, showing one embodiment of the present invention of FIG. 1.

The schematic in FIG. 2 provides additional detail of the interlock system 10. The schematic depicts a generic vehicle braking system using an ABS control module 18 which also, in this case, incorporates a Traction Control System (TCS) into the ABS module 18. The TCS of the ABS/TCS module provides a signal to the Engine Control Module 20 which is in turn capable of regulating the throttle or otherwise stopping the engine or disabling it from developing power.

Under standard operating conditions the ABS/TCS control module 18 receives wheel speed information from the sensors 22 located at the braking wheels 25 and detects incipient slip of the wheels 25 to prevent the brakes 24 from locking the wheels 25 by appropriately modulating hydraulic pressure to the brake calipers 26. The hydraulic pressure is typically provided by the pump/motor assembly 28, with pressurized brake fluid stored in the accumulator 30 and distributed upon actuation of the brake system by the master cylinder 32. The ABS/TCS control module 18 provides signals which can actuate the master cylinder 32 and pressure modulator 34 to increase or decrease the hydraulic pressure applied to brake calipers 26.

Electrically connected to provide input signals to the ABS/TCS module 18 are the object detection sensors 14, the door sensor 36, the interlock override switch 38 and the interlock defeat switch 40. In the preferred embodiment the ABS/TCS module 18 is modified with appropriate circuitry to perform the logic and timing functions necessary to activate and control the interlock function. Alternatively a separate electronic circuit which is not integrated with the ABS/ICS module could provide these functions.

There may be multiple object detection sensors 14 at the front rear and/or sides of the bus 12 to provide the desired coverage of the danger zones. The door sensor 36 may be a component of the warning light and stop arm activation system usually provided on school buses.

Upon coming to a stop to load or unload passengers, the open door signal provided by the door sensor 36 activates the interlock function of the ABS/TCS control module 18. The interlock function remains activated until a predetermined time after the closed door signal is received from the door sensor 36 to allow discharged passengers or other pedestrians to clear the danger zones of the bus.

While the interlock function of the ABS/TCS control module 18 is activated, a signal from any of the object detection sensors 14 causes the control module 18 to automatically apply the brake calipers 26 by actuating the master cylinder 32 providing a safety interlock. When the brakes 24 are applied, vehicle movement is prevented, even if the driver applies the engine throttle, thus protecting the pedestrian in the danger zone. If desired the ABS/TCS control module 18 may also use its TCS function to disable the throttle by providing a signal to the engine control module when interlocked.

It is easily foreseeable that sometimes the object detection sensor 14 will be activated by an object other than a pedestrian or by a pedestrian not located in the intended direction of travel. For example, another bus could pull up behind a bus equipped with the present invention and activate the interlock. For that purpose an interlock override switch 38 is provided. The interlock override switch 38 allows the operator, after inspection of the danger zone to temporarily disable the interlock during one cycle of activation of the interlock by the door sensor 36. A key operated interlock defeat switch 40 is also provided to disable the interlock for more extended periods and allow vehicle movement should the interlock malfunction or the interlock not be needed. If desired, inadvertent activation of the interlock can also be minimized by sensing the potential direction of travel using a direction sensor 42 and only applying the brakes when the pedestrian is in the true path of vehicle movement. However, this may apply only to the forward and rearward sensors 14A, 14D. The side detection sensors 14B, C, E, F may alert a problem regardless of the direction of travel if the detected object is between the wheels 25. If the detected object is proximate to the wheels 25 but not between them the direction sensor 42 may still be used to only apply the brakes 24 when the pedestrian is in the true path of vehicle movement.

While the best nodes for carrying out the invention have been described in detail the true scope of the disclosure should not be so limited, since those familiar with the art to which this invention relates will recognize various alternative designs and embodiments for practicing the invention within the scope of the appended claims.

What is claimed is:

1. A safety interlock system for a bus having brakes and an anti-lock braking system capable of actively applying the brakes comprising:
   an object sensor mounted to a side of the bus capable of detecting the presence of an object in a danger zone proximate to the wheels on either side of the bus, wherein the danger zone is such that the object is in one of: the forward path of the wheels, the rear path of the wheels, and immediately proximate thereto;
   providing an activation signal based upon the object sensed within the danger zone;
   a door sensor capable of detecting the open or closed state of a door of said bus and providing an open door signal upon opening of said door and a close door signal upon closing said door; and
   a control circuit activating said safety interlock system after said open door signal is received and deactivating the interlock system after said close door signal is received, whereupon said control circuit activates said brakes via the anti-lock braking system to prevent motion of said bus when said activation signal is received from said object sensor and said safety interlock system is activated.

2. The safety interlock system of claim 1, further comprising an interlock defeat switch capable of providing a defeat signal to said control circuit which prevents activation of said safety interlock system.

3. The safety interlock system of claim 1, wherein the interlock function remains activated for a predetermined time after the close door signal is received, whereupon the control circuit deactivates the interlock system.

4. The safety interlock system of claim 1, further comprising an interlock override switch allowing an operator of said bus to temporarily disable said safety interlock system during one cycle of activation.

5. The safety interlock system of claim 1, wherein the danger zone is proximate to the wheels on passenger door side of said bus.

6. The safety interlock system of claim 5, wherein said control circuit disables a throttle of said bus when said safety interlock system is activated and said object sensor activation signal is received.

7. The safety interlock system of claim 1, wherein said control circuit is integral with an anti-lock braking system control module.

8. The safety interlock system of claim 1, wherein the control circuit is capable of activating said safety interlock system when the bus is stopped and said activation signal is received.

9. The safety interlock system of claim 1, wherein said control circuit is integral with a traction control system control module.

10. The safety interlock system of claim 9, wherein said control circuit disables a throttle of said bus when said safety interlock system is activated and said activation signal is received.

11. The safety interlock system of claim 1, wherein the danger zone for object detection includes between the wheels.

12. The safety interlock system of claim 1, wherein the danger zone for object detection includes underneath the bus.

13. A safety interlock system for bus having brakes and an anti-lock braking system capable of actively applying the brakes comprising:
   an object sensor capable of detecting the presence of an object in a danger zone proximate to the wheels on either side of the bus, wherein the danger zone is such that the object is in one of: the forward path of the wheels, the rear path of the wheels, and immediately proximate thereto;
   providing a detection signal based upon the object sensed within the danger zone;
   a door sensor capable of detecting the open or closed state of a door of said bus and providing an open door signal after opening of the door and a close door signal after closing the door;
   a control circuit activating said safety interlock system when said open door signal is received and deactivating the interlock system when said close door signal is received, the control circuit activating said brakes to prevent motion of the bus when said detection signal is received from said object sensor and said safety interlock system is activated; and
   an interlock override switch allowing an operator of said bus to temporarily deactivate said safety interlock system during one cycle of activation by the open door signal.

14. The safety interlock system of claim 13, further comprising an interlock defeat switch capable of providing a defeat signal to said control circuit which prevents activation of said safety interlock system.

15. The safety interlock system of claim 13, further comprising a door sensor capable of detecting the open or closed state of a door of said bus and providing an open door signal upon opening of said door and a close door signal upon closing said door; wherein the control circuit activates the safety interlock system after said open door signal is received and deactivates the interlock system after said close door signal is received.

16. The safety interlock system of claim 13, wherein the danger zone for object detection includes between the wheels.

17. The safety interlock system of claim 13, wherein the danger zone for object detection includes underneath the bus.

* * * * *